US010975771B2

(12) United States Patent
Nakazawa et al.

(10) Patent No.: US 10,975,771 B2
(45) Date of Patent: Apr. 13, 2021

(54) GAS TURBINE COMBINED CYCLE PLANT AND METHOD FOR CONTROLLING GAS TURBINE COMBINED CYCLE PLANT

(71) Applicant: Mitsubishi Hitachi Power Systems, Ltd., Kanagawa (JP)

(72) Inventors: Yuki Nakazawa, Kanagawa (JP); Akihiko Saito, Tokyo (JP); Hiroyuki Nakagawa, Kanagawa (JP); Ryo Koto, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 90 days.

(21) Appl. No.: 16/491,419

(22) PCT Filed: Apr. 4, 2018

(86) PCT No.: PCT/JP2018/014491
§ 371 (c)(1),
(2) Date: Sep. 5, 2019

(87) PCT Pub. No.: WO2018/190231
PCT Pub. Date: Oct. 18, 2018

(65) Prior Publication Data
US 2020/0032713 A1 Jan. 30, 2020

(30) Foreign Application Priority Data

Apr. 10, 2017 (JP) .............................. JP2017-077722

(51) Int. Cl.
*F02C 7/224* (2006.01)
*F02C 6/18* (2006.01)

(52) U.S. Cl.
CPC ............... *F02C 7/224* (2013.01); *F02C 6/18* (2013.01); *F05D 2240/35* (2013.01); *F05D 2260/20* (2013.01); *Y02E 20/16* (2013.01)

(58) Field of Classification Search
CPC ............. F02C 7/224; F02C 6/18; Y02E 20/16
See application file for complete search history.

(56) References Cited

U.S. PATENT DOCUMENTS 5,357,746 A * 10/1994 Myers .................. F01K 23/106
60/39.182
5,845,481 A * 12/1998 Briesch .................. F01K 23/10
60/776

(Continued)

FOREIGN PATENT DOCUMENTS

JP 2000-161084 6/2000
JP 2000-213374 8/2000

(Continued)

OTHER PUBLICATIONS

Written Opinion of the International Search Authority dated Jun. 6, 2018 in corresponding International Patent Application No. PCT/JP2018/014491, with English-language translation.

(Continued)

*Primary Examiner* — Steven M Sutherland
(74) *Attorney, Agent, or Firm* — Wenderoth, Lind & Ponack, L.L.P.

(57) ABSTRACT

A gas turbine combined cycle plant includes a fuel gas heater configured to heat fuel gas to be supplied to a combustor of a gas turbine using heated water heated by an exhaust heat recovery boiler; a return valve disposed on a heated water returning line to return heated water passing through the heater to the boiler; a dump valve disposed on a condensate line bifurcated from the heated water returning line between the return valve and the heater to return the heated water to a condenser; and a control unit configured to control operation of the return and dump valves. When load of the turbine falls below a lower limit, the control unit closes the return valve and keeps the opening degree of the dump valve at a (Continued)

specified degree to reduce a flow rate of the heated water flowing in the heater for a predetermined time.

6 Claims, 6 Drawing Sheets

(56) References Cited

U.S. PATENT DOCUMENTS

| 9,163,827 | B2* | 10/2015 | Wilson | F02C 3/28 |
|---|---|---|---|---|
| 2011/0185702 | A1* | 8/2011 | Bilton | F02C 9/26 |
| | | | | 60/39.182 |
| 2013/0186435 | A1* | 7/2013 | Saha | F01K 23/10 |
| | | | | 134/36 |

FOREIGN PATENT DOCUMENTS

| JP | 2001-329806 | 11/2001 | | |
|---|---|---|---|---|
| JP | 2012-184735 | 9/2012 | | |
| WO | WO-2015146547 A1 * | 10/2015 | | G01M 3/2815 |

OTHER PUBLICATIONS

International Search Report dated Jun. 26, 2018 in corresponding International Patent Application No. PCT/JP2018/014491, with English-language translation.

Written Opinion of the International Search Authority dated Jun. 26, 2018 in corresponding International Patent Application No. PCT/JP2018/014491, with English-language translation.

\* cited by examiner

GAS TURBINE COMBINED CYCLE PLANT AND METHOD FOR CONTROLLING GAS TURBINE COMBINED CYCLE PLANT

FIELD

The present invention relates to a gas turbine combined cycle plant equipped with a fuel gas heater to heat fuel gas to be supplied to the gas turbine and a method for controlling such a gas turbine combined cycle plant. This application claims priority to Japanese Patent Application Laid-open No. 2017-077722, filed Apr. 10, 2017, and incorporated by reference herein for all purposes.

BACKGROUND

Conventionally known gas turbine combined cycle plants generally include a fuel gas heater for preheating fuel gas to be supplied to a combustor of the gas turbine (For example, see Patent Literature 1). This type of fuel gas heater is located upstream of the combustor, and includes a tubular heat exchanger connected to an intermediate outlet (an outlet of a mid-pressure economizer) of an exhaust heat recovery boiler. Fuel gas passing through the fuel gas heater receives heat transferred from heated water running out through the intermediate outlet of the exhaust heat recovery boiler, which increases the temperature of the fuel gas. This method improves the thermal efficiency of the gas turbine.

CITATION LIST

Patent Literature

Patent Literature 1: Japanese Patent Application Laid-open No. 2001-329806

SUMMARY

Technical Problem

The fuel gas heater is provided with a heated water returning line to return heated water, passing through the fuel gas heater, to the exhaust heat recovery boiler and a condensate line bifurcated from the heated water returning line and configured to return the heated water to a condenser. The heated water returning line has a return valve to adjust the flow rate of heated water necessary for fuel heating during normal operation of the gas turbine. The condensate line has a dump valve to adjust the flow rate of heated water necessary for fuel heating in starting up or in stopping the operation of the gas turbine.

A sudden change in the load of the gas turbine may make the gas turbine into, what is called, an interlock state. In this state, the amount of fuel gas supplied to the combustor needs to be immediately reduced. In response to a reduction in the flow rate of fuel gas passing through the fuel gas heater, the dump valve at a full closed position is turned open to adjust the flow rate, and the return valve being open for adjusting the flow rate is turned to a full closed position. This operation can keep high-temperature heated water from returning to the exhaust heat recovery boiler.

A reduction in the amount of supplied fuel gas reduces the heat capacity of the fuel gas, which may cause the heated water passing through the fuel gas heater to sharply raise the temperature of the fuel gas. Turning the return valve and the dump valve to full closed positions can reduce the flow rate of the heated water, which, however, increases the supply pressure of the heated water. Surplus heated water thus needs to be returned to the condenser.

From the above viewpoints, it is an object of the present invention to provide a gas turbine combined cycle plant capable of easily fixing problems, occurring upon a change in the load of the gas turbine due to use of heated water heated at an exhaust heat recovery boiler as a heat source for a fuel gas heater.

Solution to Problem

To solve the problem described above and achieve the object, a gas turbine combined cycle plant according to the present invention includes: a gas turbine; an exhaust heat recovery boiler configured to recover exhausted heat of the gas turbine to generate steam; a fuel gas heater configured to heat fuel gas to be supplied to a combustor of the gas turbine using heated water that has been heated by the exhaust heat recovery boiler to serve as a heat source; a return valve disposed on a heated water returning line to return heated water passing through the fuel gas heater to the exhaust heat recovery boiler; a dump valve disposed on a condensate line bifurcated from the heated water returning line between the return valve and the fuel gas heater to return the heated water to a condenser; and a control unit configured to control operation of the return valve and the dump valve. When load of the gas turbine falls below a predetermined lower limit, the control unit closes the return valve and keeps the opening degree of the dump valve at a specified opening degree predetermined to reduce a flow rate of the heated water flowing in the fuel gas heater for a predetermined time.

With this configuration, when the flow rate of fuel gas flowing in the fuel gas heater is decreased with a drop in the load of the gas turbine to below a predetermined lower limit, the return valve is closed, and the dump valve is kept open at the specified opening degree for the predetermined time. This operation can reduce the flow rate of heated water supplied to the fuel gas heater and thus can control a sharp rise in the temperature of fuel gas. This configuration is therefore beneficial in easily fixing problems, occurring upon a load change in the gas turbine.

In this case, it is preferable that, when the predetermined time has elapsed, the control unit increases the valve opening degree of the dump valve stepwise from the specified opening degree to a target opening degree corresponding to a target flow rate of the heated water calculated depending on load of the gas turbine. With this configuration, the valve opening degree of the dump valve is increased stepwise from the specified opening degree to a target opening degree, which can control a sharp rise in the temperature of fuel gas occurring with an increase in the flow rate of heated water.

Further, the control unit may store a table that defines an upper limit of an increment rate, indicating an increase in a flow rate of the heated water per unit time, for each different fuel gas outlet temperature at an outlet of the fuel gas heater, and the control unit may control the valve opening degree of the dump valve in a range where the increment rate is equal to or under the upper limit set for a measured fuel gas outlet temperature. With this configuration, the valve opening degree of the dump valve is controlled in a range where the increment rate is equal to or under the upper limit determined for each fuel gas outlet temperature, which enables accurate adjustment of the fuel gas temperature.

Further, when load of the gas turbine exceeds a predetermined lower limit before the predetermined time elapses, the control unit may increase the valve opening degree of the dump valve stepwise from the specified opening degree to the target opening degree without waiting until the predetermined time elapses. This configuration can improve flexibility for the load of the gas turbine.

Further, it may be configured to include a steam turbine driven by the steam generated by the exhaust heat recovery boiler. This configuration allows the steam generated by the exhaust heat recovery boiler to be effectively used by the steam turbine.

Further, the present invention is a method for controlling a gas turbine combined cycle plant that includes a gas turbine, an exhaust heat recovery boiler configured to recover exhausted heat of the gas turbine to generate steam, a fuel gas heater configured to heat fuel gas to be supplied to a combustor of the gas turbine using heated water that has been heated by the exhaust heat recovery boiler to serve as a heat source, a return valve disposed on a heated water returning line to return heated water passing through the fuel gas heater to the exhaust heat recovery boiler, and a dump valve disposed on a condensate line bifurcated from the heated water returning line between the return valve and the fuel gas heater to return the heated water to a condenser. The method includes the steps of: determining whether load of the gas turbine falls below a predetermined lower limit, and when the load falls below the predetermined lower limit, closing the return valve and keeping the opening degree of the dump valve at a specified opening degree determined to reduce a flow rate of the heated water flowing in the fuel gas heater for a predetermined time. This configuration is beneficial in controlling the flow rate of heated water supplied to the fuel gas heater and in controlling a sharp rise in the fuel gas temperature. This configuration is therefore beneficial in easily fixing problems, occurring upon a load change in the gas turbine.

Advantageous Effects of Invention

According to the present invention, when the flow rate of fuel gas flowing in a fuel gas heater is reduced with a drop in the load of a gas turbine to below a predetermined lower limit, a return valve is closed, and a dump valve is kept open at a specified opening degree for a predetermined time. This operation can reduce the flow rate of heated water supplied to the fuel gas heater and thus can control a sharp rise in the temperature of fuel gas. In this manner, problems occurring with a load change in the gas turbine can be easily fixed.

DESCRIPTION OF EMBODIMENTS

Embodiments according to the present invention will now be described with reference to the drawing. It should be noted that the embodiments are not intended to limit the present invention. Components of the following embodiments can be combined with one another as appropriate. Some of the components may be omitted.

Figure 1:
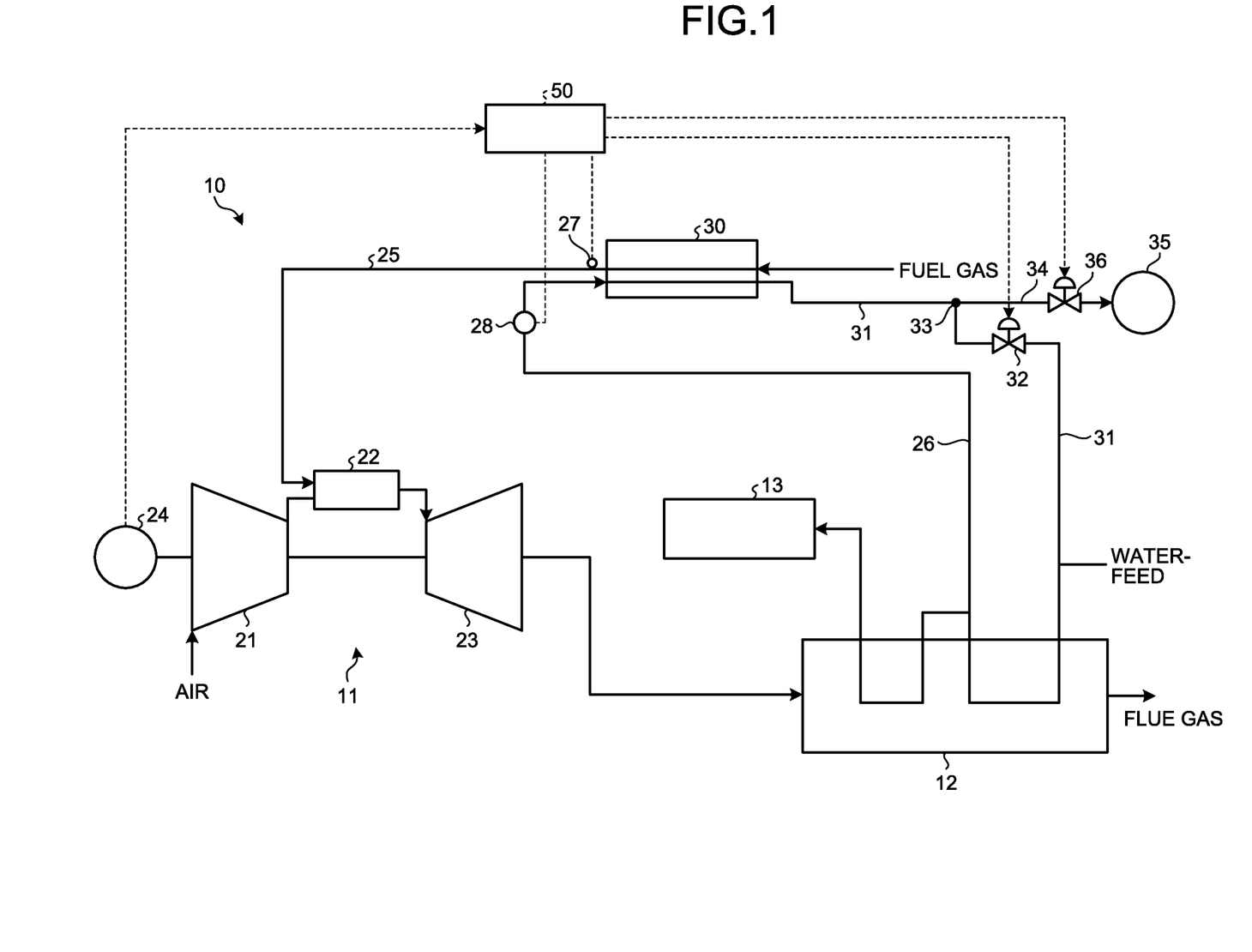
FIG. 1 is a system diagram that illustrates a combined cycle plant according to an embodiment.

FIG. 1 is a system diagram that illustrates a combined cycle plant according to an embodiment. As illustrated in FIG. 1, a combined cycle plant (a gas turbine combined cycle plant) 10 mainly includes a gas turbine 11, an exhaust heat recovery boiler 12, a steam turbine 13, and a control unit 50 that controls operation of the combined cycle plant 10. The combined cycle plant 10 is a power plant that supplies electric power or electric power and thermal energy using a combined cycle of the gas turbine 11 and the steam turbine 13. The gas turbine 11 drives a power generator 24 by expanding a working fluid, having the pressure increased by a compressor 21 and combusted by the combustor 22, with a turbine 23. Flue gas discharged from the turbine 23 of the gas turbine 11 is conveyed to the exhaust heat recovery boiler 12 and used as a heat source to generate steam.

The exhaust heat recovery boiler 12 receives heat transferred from flue gas of the gas turbine 11, generates steam (water vapor), and supplies the steam to the steam turbine 13. The steam turbine 13 drives a turbine (not illustrated) using the supplied steam and produces power.

As illustrated in FIG. 1, the combined cycle plant 10 further includes a fuel gas heater 30 disposed on a fuel gas supply line 25, through which fuel gas is supplied to the combustor 22 of the gas turbine 11, with the intention to improve the thermal efficiency of the combustor 22. The fuel gas heater 30 is connected with an intermediate outlet (an outlet of a mid-pressure economizer (not illustrated)) of the exhaust heat recovery boiler 12 through a heated water supply line 26. At the fuel gas heater 30, heat is transferred between fuel gas introduced through the fuel gas supply line 25 and high-temperature (for example, 240 degrees Celsius) heated water introduced through the heated water supply line 26. The fuel gas, having the temperature increased through the heat transfer, is introduced to the combustor 22. A fuel gas temperature sensor 27 for detecting the outlet temperature of fuel gas is disposed close to the outlet of the fuel gas heater 30, on the fuel gas supply line 25. The heated water supply line 26 is provided with a heated water flow-rate sensor 28 for detecting the flow rate (the volume flow rate [t/h]) of heated water to be supplied to the fuel gas heater 30.

The outlet of the fuel gas heater 30 is connected with an end of a heated water returning line 31, the other end of which is connected with a feed-water inlet of the exhaust heat recovery boiler 12. A return valve 32 is provided on the heated water returning line 31 between the fuel gas heater 30 and the exhaust heat recovery boiler 12. With the return valve 32 opened, heated water, the temperature of which has been decreased by the fuel gas heater 30, is returned to the exhaust heat recovery boiler 12. The heated water returning line 31 has a bifurcation 33 between the fuel gas heater 30 and the return valve 32. The bifurcation 33 is connected with an end of a condensate line 34, the other end of which is connected with a condenser 35 of the steam turbine 13. The condensate line 34 is provided with a dump valve 36. With the dump valve 36 opened, heated water, the temperature of which has been decreased by the fuel gas heater 30, is returned to the condenser 35.

In the combined cycle plant 10 configured as above, the control unit 50 provides on-off control on the return valve 32 and the dump valve 36 based on, for example, the load (for example, the electric power [MW] produced by the power generator 24) of the gas turbine 11 and the flow rate (the volume flow rate [t/h]) of heated water.

During normal load operation of the gas turbine 11, the control unit 50 closes the dump valve 36 and controls the degree of opening (valve opening degree) of the return valve 32. More specifically, the control unit 50 provides feedforward control on the return valve 32 based on the load of the gas turbine 11, considering the valve characteristics. In this case, a target flow rate of heated water for the load of the gas turbine 11 has been set in the control unit 50, and the control unit 50 provides feedforward control on the valve opening degree of the return valve 32 so as to obtain the target flow rate. The dump valve 36 has its valve opening degree controlled mainly when the gas turbine 11 starts up or stops. More specifically, the control unit 50 provides feedback control on the valve opening degree of the dump valve 36 based on the difference between the flow rate of heated water flowing in the heated water returning line 31 and the target flow rate of the heated water set for the load of the gas turbine 11. During this control, the return valve 32 is kept closed.

On a sudden reduction in the load of the gas turbine 11, such as when the connection of the power generator 24 with a compressor 21 and the turbine 23 is shut, the amount of fuel gas supplied to the combustor 22 needs to be reduced with a reduction in the load. In this case, the control unit 50 adjusts the opening degree of the return valve 32 from a flow rate control position to a full closed position, which can keep the high-temperature heated water from flowing back to the exhaust heat recovery boiler 12.

A reduction in the amount of supplied fuel gas reduces the heat capacity of the fuel gas. Simply controlling the valve opening degree of the dump valve 36, based on the difference of the actual flow rate and the target flow rate of heated water, causes the heated water to excessively heat the fuel gas, which may problematically sharply raise the temperature of the fuel gas.

Figure 2:
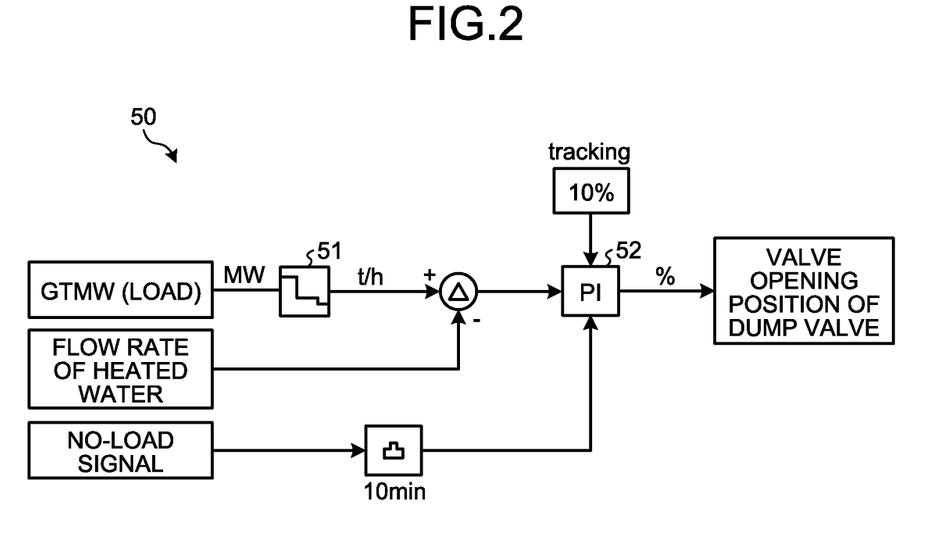
FIG. 2 is an illustrative drawing of a logic to control the valve opening degree of a dump valve.
Figure 3:
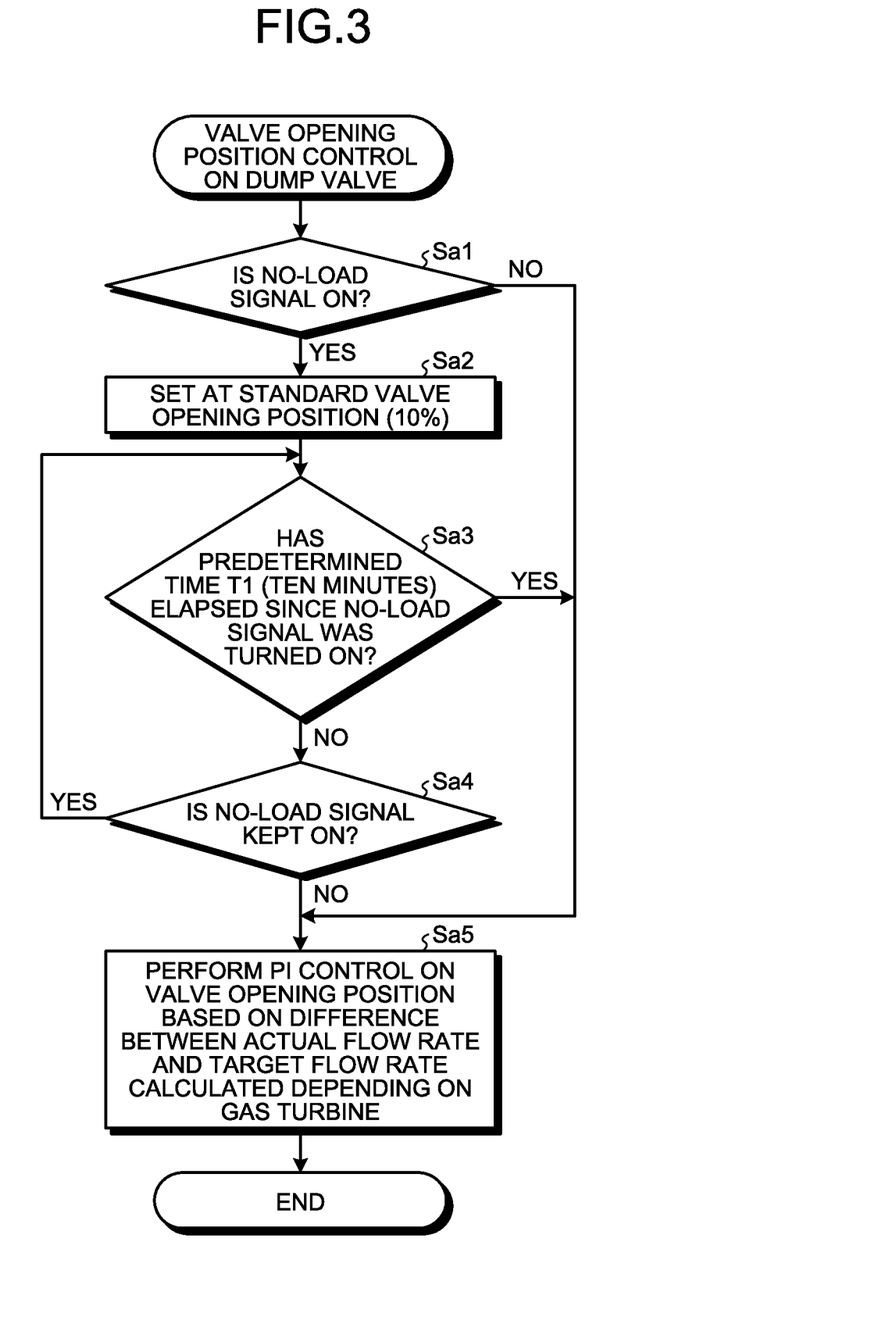
FIG. 3 is a flowchart that illustrates a procedure to control the valve opening degree of the dump valve.
Figure 4:
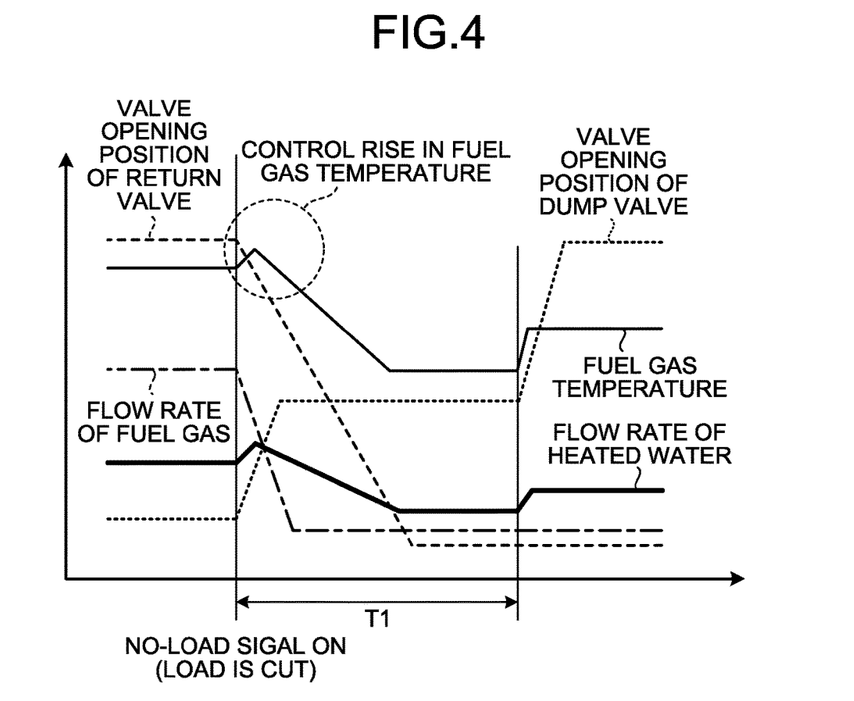
FIG. 4 is a drawing that illustrates changes in the valve opening degree of the dump valve and in the temperature of fuel gas in response to a load change.

The configuration of the embodiment exerts advantageous effects in adjusting the valve opening degree of the dump valve 36 in a manner controlling a sharp rise in the temperature of fuel gas. The valve opening degree of the dump valve 36 is controlled as below. FIG. 2 is an illustrative drawing of a logic to control the valve opening degree of the dump valve. FIG. 3 is a flowchart that illustrates a procedure to control the valve opening degree of the dump valve. FIG. 4 is a drawing that illustrates changes in the valve opening degree of the dump valve and in the temperature of fuel gas in response to a load change.

In FIG. 2, GTMW indicates electric power [MW](load of the gas turbine 11) produced by the power generator 24, and a flow rate calculator 51 is notified of the produced electric power [MW]. The flow rate calculator 51 calculates the target flow rate (the volume flow rate [t/h]) of heated water necessary for the fuel gas heater 30 to heat fuel gas, based on the electric power [MW] (the magnitude of the load). The calculated target flow rate is compared with the flow rate of heated water measured by the heated water flow-rate sensor 28 (FIG. 1), and the difference therebetween is input to a PI control unit 52 and used to determine the valve opening degree of the dump valve 36.

In the configuration of the embodiment, if the produced electric power [MW] is equal to or under a predetermined lower limit (for example, 0 [MW]), a no-load signal is output. Upon receipt of the no-load signal, the control unit 50 controls the dump valve 36 to stay open at a specified opening degree predetermined (for example, a degree of opening of 10%) for a predetermined time (for example, ten minutes).

The procedure of control will now be described. As illustrated in FIG. 3, the control unit 50 determines whether a no-load signal is on, in other words, whether the control unit 50 receives the no-load signal (Step Sa1). If the no-load signal is determined not to be on (No at Step Sa1), the processing proceeds to Step Sa5. If the no-load signal is determined to be on (Yes at Step Sa1), the control unit 50 starts counting a predetermined time T1 (for example, ten minutes) with the time of receipt of the no-load signal as a reference time. The control unit 50 further adjusts the valve opening degree of the dump valve 36 to a specified opening degree predetermined (for example, 10%) (Step Sa2).

The predetermined time T1 (for example, ten minutes) and a value of the specified opening degree (for example, 10%) are determined based on results of simulations and experiments using a real machine, such that an increase in the temperature of fuel gas does not exceed a defined value while the flow rate of heated water necessary for the fuel gas heater 30 is secured. The specified opening degree indicates the degree of opening at which the flow rate of heated water flowing in the fuel gas heater 30 is reduced so as to control a rise in the temperature of fuel gas. The predetermined time T1 is set long enough to control a sharp rise in the temperature of the fuel gas.

In this embodiment, as illustrated in FIG. 4, when the no-load signal is turned on, the return valve 32 is closed, and the valve opening degree of the dump valve 36 is adjusted to the predetermined specified opening degree (for example, 10%). This operation enables a reduction in the flow rate of heated water flowing in the fuel gas heater 30. This structure can therefore control a sharp rise in the temperature of fuel gas, which occurs right after the no-load signal is turned on in the above predetermined time T1.

The control unit 50 determines whether the predetermined time T1 (for example, ten minutes) has elapsed since the no-load signal was turned on (Step Sa3). If the predetermined time T1 (for example, ten minutes) is determined to have elapsed (Yes at Step Sa3), the control unit 50 performs PI control to determine the valve opening degree of the dump valve 36, based on the difference between the target flow rate calculated for the load (produced electric power [MW]) of the gas turbine 11 and the actual flow rate of heated water (Step Sa5). With the valve opening degree of the dump valve 36 adjusted to the determined valve opening degree, as illustrated in FIG. 4, the flow rate of heated water is increased, which accordingly increases the temperature of fuel gas. Such increases enable quick starting up of the gas turbine 11 once the no-load signal is turned off, in other words, when the operation of the gas turbine 11 is started.

If the predetermined time T1 (for example, ten minutes) is determined not to have elapsed (No at Step Sa3), the control unit 50 determines whether the no-load signal is kept on (Step Sa4). If the no-load signal is determined to be kept on (Yes at Step Sa4), the processing returns to Step Sa3. If the no-load signal is determined not to be kept on any longer (No at Step Sa4), the control unit 50 performs PI control to determine the valve opening degree of the dump valve 36 based on the difference between the target flow rate calculated for the load (produced electric power [MW]) of the gas turbine 11 and the actual flow rate of heated water (Step Sa5). In this configuration, when the no-load signal is turned off, in other words, when operation of the gas turbine 11 is started, before the predetermined time T1 (for example, ten minutes) elapses, the valve opening degree of the dump valve 36 is controlled without waiting until the predetermined time T1 elapses. This structure achieves more flexible control of the valve opening degree of the dump valve 36 depending on the load of the gas turbine 11.

Figure 5:
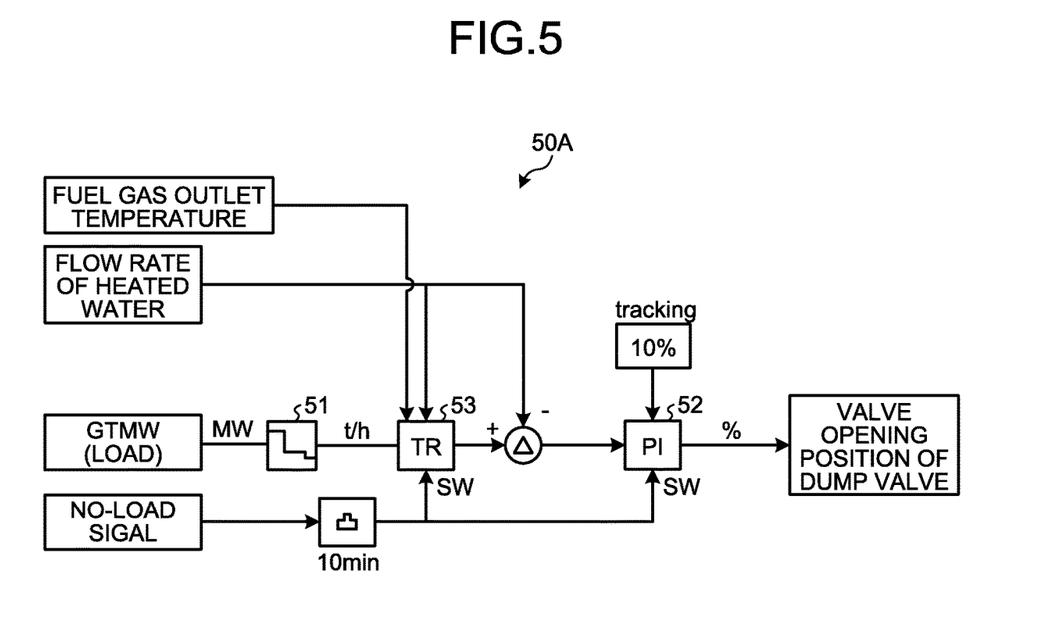
FIG. 5 is an illustrative drawing of a logic to control the valve opening degree of a dump valve according to another different embodiment.
Figure 6:
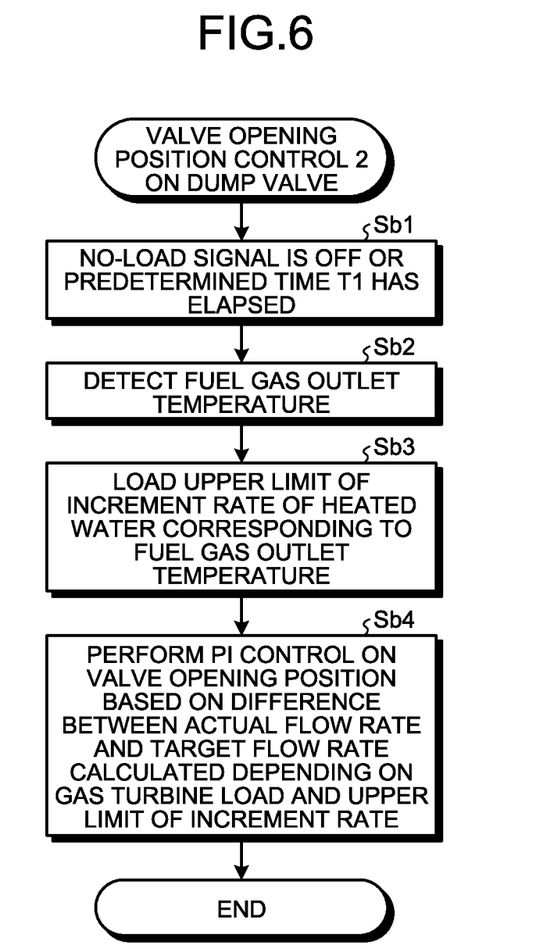
FIG. 6 is a flowchart that illustrates a procedure to control the valve opening degree of the dump valve.
Figure 7:
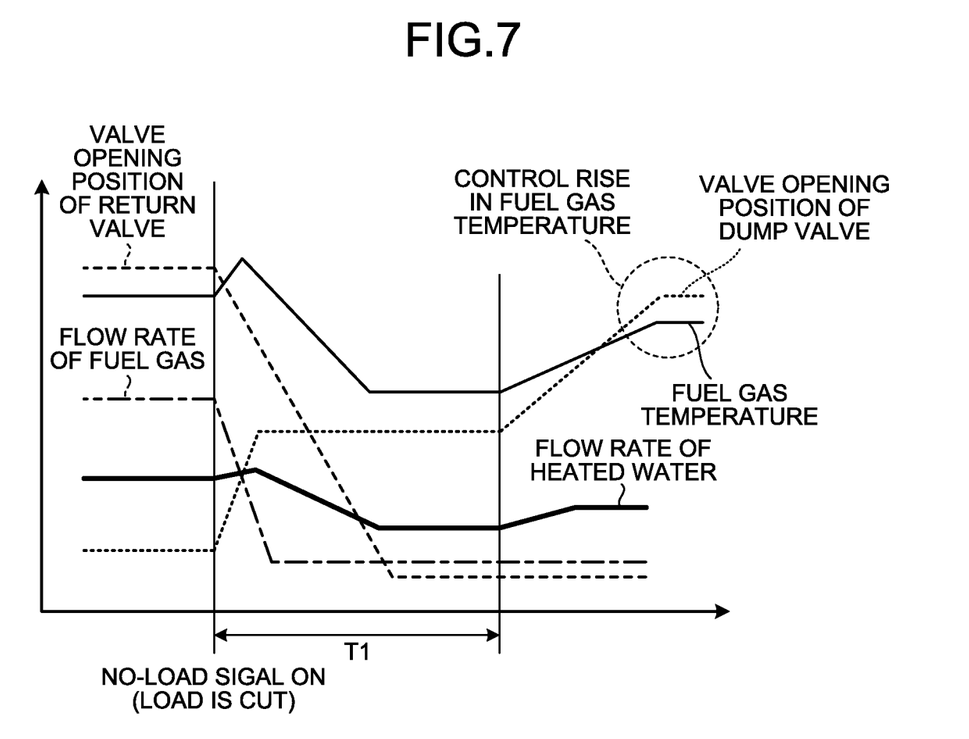
FIG. 7 is a drawing that illustrates changes in the valve opening degree of the dump valve and in the temperature of fuel gas in response to a load change.

Another different embodiment will now be described. The configuration of the above embodiment can control a sharp rise in the temperature of fuel gas, which occurs right after a sudden drop in the load of the gas turbine 11 (for example, when the load is cut). This configuration, however, still suffers from a sharp rise in the temperature of fuel gas when the flow rate of heated water is suddenly increased in returning the control on the valve opening degree of the dump valve 36 to PI control. The different embodiment relates to how the valve opening degree of the dump valve 36 is controlled when the valve opening degree control is turned to PI control. FIG. 5 is an illustrative drawing of a logic to control the valve opening degree of a dump valve according to the different embodiment. FIG. 6 is a flowchart that illustrates a procedure to control the valve opening degree of the dump valve. FIG. 7 is a drawing that illustrates changes in the valve opening degree of the dump valve and in the temperature of fuel gas in response to a load change. In the different embodiment, like reference numerals of the above embodiment indicate like components, and detailed description thereof will be omitted.

As illustrated in FIG. 5, a control unit 50A of the different embodiment causes a target flow rate calculated by the flow rate calculator 51 to be output to an increment rate setting unit 53. The increment rate setting unit 53 determines an increment rate at which the flow rate of heated water is increased to the calculated target flow rate, when, for example, a no-load signal is turned off and the valve opening degree control on the dump valve 36 is turned to PI control. The increment rate is a value representing increments in the flow rate of heated water per unit time. For example, with an increment rate of 10 [(t/h)/min], the flow rate of heated water is increased by an increment of 10 [t/h] every minute. The increment rate setting unit 53 outputs the flow rate (the target flow rate) increased stepwise to the calculated target flow rate at the determined increment rate.

In the different embodiment, the increment rate setting unit 53 includes a table (not illustrated) that defines upper limits of the increment rate for respective different fuel gas outlet temperatures at the outlet of the fuel gas heater 30. An upper limit of the increment rate is set based on the fuel gas outlet temperature measured by the fuel gas temperature sensor 27 (FIG. 1). The upper limit of the increment rate may be determined in a range where an increase in the fuel gas temperature does not exceed a baseline, with reference to the results of simulations, experiments using a real machine, and other methods.

The target flow rate, increased stepwise and output from the increment rate setting unit 53, is compared with the flow rate of heated water measured by the heated water flow-rate sensor 28 (FIG. 1). The difference therebetween is input to the PI control unit 52, and the valve opening degree of the dump valve 36 is determined.

The procedure of control will now be described. FIG. 6 illustrates a procedure in which valve opening degree control on the dump valve 36 is turned to PI control. As illustrated in FIG. 6, when the no-load signal is turned off, or when a predetermined time T1 (for example, 10 minutes) has elapsed after the no-load signal was turned on (Step Sb1), the control unit 50A causes the fuel gas temperature sensor 27 to measure the fuel gas outlet temperature and acquires the measured fuel gas outlet temperature (Step Sb2).

The control unit 50A loads the upper limit of the increment rate of heated water, corresponding to the measured fuel gas outlet temperature (Step Sb3). The upper limit of the increment rate is loaded from the table of the increment rate setting unit 53, the table defining the upper limit of the increment rate for each fuel gas outlet temperature. Use of the table is beneficial in easily setting the upper limit of the increment rate of heated water corresponding to an actual fuel gas outlet temperature. The fuel gas outlet temperature may be periodically measured (for example, every 30 seconds), and a corresponding upper limit of the increment rate may be loaded on every measurement. This configuration allows the upper limit of the increment rate of heated water to be accurately set, upon a change in the fuel gas outlet temperature.

The control unit 50A controls the valve opening degree of the dump valve 36 in the range where the increment rate of heated water is equal to or under the upper limit (Step Sb4). Specifically, the control unit 50A performs PI control to adjust the valve opening degree of the dump valve 36 based on the difference between the target flow rate of heated water, obtained from the upper limit of the increment rate of heated water, and the actual flow rate of heated water. The valve opening degree of the dump valve 36 is increased stepwise from the specified opening degree to the target opening degree. As illustrated in FIG. 7, this configuration can control a sharp rise in the fuel gas temperature, which occurs with an increase in the flow rate of heated water, after the predetermined time T1 (for example, ten minutes) has elapsed. The valve opening degree of the dump valve 36 is controlled in the range where the increment rate of heated water is equal to or under the upper limit, determined for each measured fuel gas outlet temperature. An increase in the flow rate of heated water is thus controlled not to exceed the upper limit of the increment rate, which configuration enables accurate adjustment of the fuel gas temperature.

As described above, the combined cycle plant 10 according to the embodiments includes: the gas turbine 11, the exhaust heat recovery boiler 12 configured to recover exhausted heat of the gas turbine 11 to generate steam, the fuel gas heater 30 configured to heat fuel gas to be supplied to the combustor 22 of the gas turbine 11 using heated water that has been heated by the exhaust heat recovery boiler 12 to serve as a heat source, the return valve 32 disposed on the heated water returning line 31 to return heated water passing through the fuel gas heater 30 to the exhaust heat recovery boiler 12, the dump valve 36 disposed on the condensate line 34 bifurcated from the heated water returning line 31 between the return valve 32 and the fuel gas heater 30 to return heated water to the condenser 35, and the control unit 50 (50A) that controls operation of the return valve 32 and the dump valve 36. When a no-load signal of the gas turbine 11 is turned on, the control unit 50 (50A) closes the return valve 32 and keeps the dump valve 36 open at a specified opening degree predetermined to reduce the flow rate of heated water flowing in the fuel gas heater 30 for a predetermined time. This operation enables a reduction in the flow rate of heated water flowing in the fuel gas heater 30. This configuration can therefore control a sharp rise in the temperature of fuel gas, which occurs right after the no-load signal of the gas turbine 11 is turned on in the above predetermined time.

When the predetermined time has elapsed, the control unit 50A increases the valve opening degree of the dump valve 36 stepwise from the specified opening degree to a target opening degree corresponding to the target flow rate of heated water calculated for the load of the gas turbine 11. This operation is effective in controlling a sharp rise in the temperature of fuel gas, which occurs with an increase in the flow rate of heated water after the predetermined time has elapsed.

The control unit 50A stores a table where upper limits of the increment rate of heated water are defined for respective different fuel gas outlet temperatures at the outlet of the fuel gas heater 30. The control unit 50A controls the valve opening degree of the dump valve 36 in a range where the increment rate is equal to or under the upper limit, determined for each measured fuel gas outlet temperature. An increase in the flow rate of heated water is thus controlled not to exceed the upper limit of the increment rate, which enables accurate adjustment of the fuel gas temperature.

When the load of the gas turbine 11 exceeds a predetermined lower limit before the predetermined time elapses, the control unit 50A increases the valve opening degree of the dump valve 36 stepwise from the specified opening degree to the target opening degree without waiting until the predetermined time elapses. This structure allows valve control to be more flexible for the load of the gas turbine 11 when the gas turbine 11 is switched to load operation.

Nonlimiting example embodiments of the present invention have been described as above. The embodiments are, however, not intended to limit the scope of the present invention. The embodiments can be implemented in other various forms, and various omissions, replacements, and changes can be made without departing from the gist of the invention. The present embodiment and the modifications thereof are included in the invention described in the claims and the equivalents thereof as well as included in the scope and the gist of the invention.

REFERENCE SIGNS LIST

10 COMBINED CYCLE PLANT (GAS TURBINE COMBINED CYCLE PLANT)
11 GAS TURBINE
12 EXHAUST HEAT RECOVERY BOILER
13 STEAM TURBINE
22 COMBUSTOR
24 POWER GENERATOR
25 FUEL GAS SUPPLY LINE
26 HEATED WATER SUPPLY LINE
27 FUEL GAS TEMPERATURE SENSOR
28 HEATED WATER FLOW-RATE SENSOR
30 FUEL GAS HEATER

The invention claimed is:

1. A gas turbine combined cycle plant, comprising:
a gas turbine;
an exhaust heat recovery boiler configured to recover exhausted heat of the gas turbine to generate steam;
a fuel gas heater configured to heat fuel gas to be supplied to a combustor of the gas turbine using heated water that has been heated by the exhaust heat recovery boiler to serve as a heat source;
a return valve disposed on a heated water returning line to return the heated water passing through the fuel gas heater to the exhaust heat recovery boiler;
a dump valve disposed on a condensate line bifurcated from the heated water returning line between the return valve and the fuel gas heater to return the heated water to a condenser; and
a control unit configured to control operation of the return valve and the dump valve, wherein
when load of the gas turbine falls below a predetermined lower limit, the control unit closes the return valve and keeps an opening degree of the dump valve at a specified opening degree predetermined to reduce a flow rate of the heated water flowing in the fuel gas heater for a predetermined time.

2. The gas turbine combined cycle plant according to claim 1, wherein, when the predetermined time has elapsed, the control unit increases the valve opening degree of the dump valve stepwise from the specified opening degree to a target opening degree corresponding to a target flow rate of the heated water calculated depending on load of the gas turbine.

3. The gas turbine combined cycle plant according to claim 2, wherein the control unit stores a table that defines an upper limit of an increment rate, indicating an increase in a flow rate of the heated water per unit time, for each different fuel gas outlet temperature at an outlet of the fuel gas heater, and the control unit controls the valve opening degree of the dump valve in a range where the increment rate is equal to or under the upper limit set for a measured fuel gas outlet temperature.

4. The gas turbine combined cycle plant according to claim 2, wherein, when load of the gas turbine exceeds a predetermined lower limit before the predetermined time elapses, the control unit increases the valve opening degree of the dump valve stepwise from the specified opening degree to the target opening degree without waiting until the predetermined time elapses.

5. The gas turbine combined cycle plant according to claim 1, further comprising a steam turbine driven by the steam generated by the exhaust heat recovery boiler.

6. A method for controlling a gas turbine combined cycle plant that includes a gas turbine, an exhaust heat recovery boiler configured to recover exhausted heat of the gas turbine to generate steam, a fuel gas heater configured to heat fuel gas to be supplied to a combustor of the gas turbine using heated water that has been heated by the exhaust heat recovery boiler to serve as a heat source, a return valve disposed on a heated water returning line to return the heated water passing through the fuel gas heater to the exhaust heat recovery boiler, and a dump valve disposed on a condensate line bifurcated from the heated water returning line between the return valve and the fuel gas heater to return the heated water to a condenser, the method comprising the steps of:
determining whether load of the gas turbine falls below a predetermined lower limit, and
when the load falls below the predetermined lower limit, closing the return valve and keeping an opening degree of the dump valve at a specified opening degree determined to reduce a flow rate of the heated water flowing in the fuel gas heater for a predetermined time.

* * * * *